United States Patent
Nam et al.

(10) Patent No.: US 11,516,056 B2
(45) Date of Patent: Nov. 29, 2022

(54) APPARATUS AND METHOD FOR ALLOCATING GUARD BAND IN WIRELESS COMMUNICATION SYSTEM

(71) Applicant: Samsung Electronics Co., Ltd., Gyeonggi-do (KR)

(72) Inventors: Eungkuk Nam, Gyeonggi-do (KR); Joosung Park, Gyeonggi-do (KR); Taehyun Kim, Gyeonggi-do (KR); Kitaek Bae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 15 days.

(21) Appl. No.: 17/024,041

(22) Filed: Sep. 17, 2020

(65) Prior Publication Data

US 2021/0091987 A1  Mar. 25, 2021

(30) Foreign Application Priority Data

Sep. 19, 2019  (KR) .................. 10-2019-0115699

(51) Int. Cl.
*H04L 27/26* (2006.01)
*H04W 72/04* (2009.01)
(Continued)

(52) U.S. Cl.
CPC ........ *H04L 27/2607* (2013.01); *H04L 5/0051* (2013.01); *H04L 25/0226* (2013.01);
(Continued)

(58) Field of Classification Search
CPC ............... H04L 27/2607; H04L 5/0051; H04L 25/0226; H04W 28/0278; H04W 52/365;
(Continued)

(56) References Cited

U.S. PATENT DOCUMENTS 9,820,281 B1   11/2017   Werner et al.
10,085,281 B2   9/2018   Sun et al.
(Continued)

FOREIGN PATENT DOCUMENTS

WO   WO 2017/052326   3/2017

OTHER PUBLICATIONS

Nokia et al., "NR DL in-band emission and EVM Requirements at BS Tx", R4-1700723, 3GPP TSG-RAN WG4 Meeting #82, Feb. 13-17, 2017, 4 pages.
(Continued)

*Primary Examiner* — Chae S Lee
(74) *Attorney, Agent, or Firm* — The Farrell Law Firm, P.C.

(57) ABSTRACT

An operating method and an apparatus are provided in which state information is received from at least one of a higher layer and a plurality of terminals. A respective allocation resource is determined for each of the plurality of terminals, based on the state information. A respective guard band is determined to be allocated for each of the plurality of terminals, based on the respective allocation resource. Respective resource blocks (RBs) are determined for each of the plurality of terminals, based on the respective guard band. Information about the determined respective RBs is transmitted to respective terminals of the plurality of terminals.

18 Claims, 14 Drawing Sheets

(51) Int. Cl.
*H04W 80/08* (2009.01)
*H04L 5/00* (2006.01)
*H04W 28/02* (2009.01)
*H04W 52/36* (2009.01)
*H04L 25/02* (2006.01)

(52) U.S. Cl.
CPC ..... *H04W 28/0278* (2013.01); *H04W 52/365* (2013.01); *H04W 72/0453* (2013.01); *H04W 72/0493* (2013.01); *H04W 80/08* (2013.01)

(58) Field of Classification Search
CPC ......... H04W 72/0453; H04W 72/0493; H04W 80/08
See application file for complete search history.

(56) References Cited

U.S. PATENT DOCUMENTS

| | | | |
|---|---|---|---|
| 10,111,229 B2 | 10/2018 | Werner et al. | |
| 10,230,492 B2 | 3/2019 | Kwon et al. | |
| 10,251,172 B2 | 4/2019 | Abedini et al. | |
| 2015/0139080 A1* | 5/2015 | Ellenbeck | H04L 1/00 370/329 |
| 2017/0257876 A1* | 9/2017 | Loehr | H04W 28/0263 |
| 2017/0332387 A1 | 11/2017 | Zhang et al. | |
| 2018/0048435 A1 | 2/2018 | Islam et al. | |
| 2018/0048511 A1 | 2/2018 | Hakola et al. | |
| 2019/0059087 A1 | 2/2019 | Werner et al. | |
| 2019/0207697 A1* | 7/2019 | Ghasemzadeh | H04W 72/082 |
| 2019/0274162 A1 | 9/2019 | Zhang et al. | |
| 2020/0236710 A1* | 7/2020 | Sun | H04W 74/0808 |
| 2021/0345352 A1* | 11/2021 | Zhao | H04L 5/14 |

OTHER PUBLICATIONS

ZTE, Sanechips, "On the Remaining Issues of MsgA Channel Structure", R1-1908181, 3GPP TSG RAN WG1 #98, Aug. 26-30, 2019, 23 pages.

International Search Report dated Jan. 8, 2021 issued in counterpart application No. PCT/KR2020/012402, 6 pages.

Eungkuk Nam et al., "Outage Probability-based Adaptive Guard Band Allocation for Mixed Numerology", . . . 2020 IEEE 17th Annual Consumer Communications & Networking Conference (CCNC), Las Vegas, NV, USA, 2020, pp. 6.

Ali A. Zaidi et al., "Waveform and Numerology to Support 5G Services and Requirements", . . . in IEEE Communications Magazine, vol. 54, No. 11, pp. 9, Nov. 2016.

* cited by examiner

APPARATUS AND METHOD FOR ALLOCATING GUARD BAND IN WIRELESS COMMUNICATION SYSTEM

CROSS-REFERENCE TO RELATED APPLICATION(S)

This application is based on and claims priority under 35 U.S.C. 119(a) to Korean Patent Application No. 10-2019-0115699, filed on Sep. 19, 2019 in the Korean Intellectual Property Office, the disclosure of which is incorporated herein by reference in its entirety.

BACKGROUND

1. Field

The disclosure generally relates to a wireless communication system and, more particularly, to an apparatus and a method for allocating a guard band in a wireless communication system.

2. Description of Related Art

To meet the demand for the increase in wireless data traffic since the deployment of 4G communication systems, efforts have been made to develop an improved 5G or pre-5G communication system. Therefore, the 5G or pre-5G communication system is also referred to as a "Beyond 4G Network" or a "Post LTE System".

The 5G communication system is implemented in higher frequency (mmWave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are described in 5G communication systems.

In addition, in 5G communication systems, system network improvement is based on advanced small cells, cloud radio access networks (RANs), ultra-dense networks, device-to-device (D2D) communication, wireless backhaul, a moving network, cooperative communication, coordinated multi-points (CoMP), reception-end interference cancellation, and the like.

In the 5G system, hybrid frequency shift keying (FSK) and quadrature amplitude modulation (FQAM) and sliding window superposition coding (SWSC) have been developed as advanced coding modulation (ACM), and filter bank multi carrier (FBMC), non-orthogonal multiple access (NOMA), and sparse code multiple access (SCMA) have been developed as advanced access technology.

SUMMARY

The disclosure provides an apparatus and a method for allocating a guard band in a wireless communication system.

According to an embodiment, an operating method of a base station in a wireless communication system is provided. The method includes receiving state information from at least one of a higher layer and a plurality of terminals; determining a respective allocation resource for each of the plurality of terminals, based on the state information; determining a respective guard band to be allocated for each of the plurality of terminals, based on the respective allocation resource; determining respective resource blocks (RBs) for each of the plurality of terminals, based on the respective guard band; and transmitting information about the determined respective RBs to respective terminals of the plurality of terminals.

According to various embodiments, there is provided a base station in a wireless communication system. The base station includes a transceiver; and at least one processor configured to be functionally connected to the transceiver. The at least one processor is configured to: receive state information from at least one of a higher layer and a plurality of terminals; determine a respective allocation resource for each of the plurality of terminals, based on the state information; determine a respective guard band to be allocated for each of the plurality of terminals, based on the respective allocation resource; determine respective RBs for each of the plurality of terminals, based on the respective guard band; and transmit information about the determined respective RBs to respective terminals of the plurality of terminals.

BRIEF DESCRIPTION OF THE DRAWINGS

The above and other aspects, features, and advantages of the disclosure will be more apparent from the following description when taken in conjunction with the accompanying drawings, in which.

DETAILED DESCRIPTION

Figure 1:
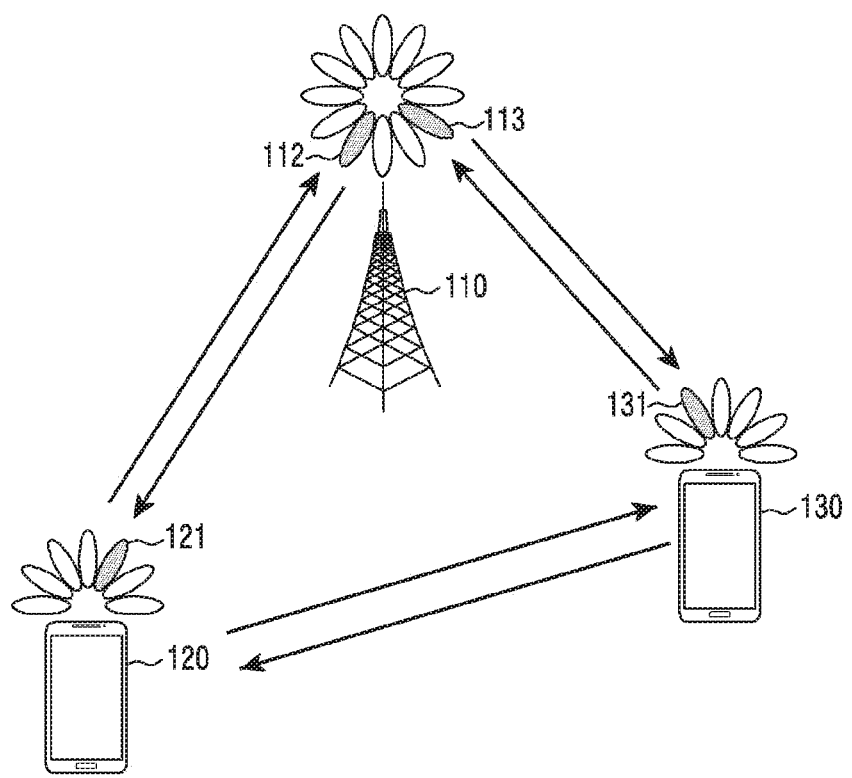
FIG. 1 is a diagram illustrating a wireless communication system, according to an embodiment.

Embodiments of the disclosure are described in detail with reference to the accompanying drawings. The same or similar components are designated by similar reference numerals although they are illustrated in different drawings. Detailed descriptions of constructions or processes known in the art may be omitted to avoid obscuring the subject matter of the disclosure.

The terms used in the disclosure are only used to describe specific embodiments, and are not intended to limit the disclosure. A singular expression may include a plural expression unless they are definitely different in context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined herein. In some cases, even a term defined in the disclosure should not be interpreted to exclude embodiments of the disclosure.

Hereinafter, various embodiments of the disclosure will be described based on a hardware approach. However, various embodiments of the disclosure include a technology that uses both hardware and software, and thus, the various embodiments of the disclosure may not exclude the perspective of software.

The disclosure described below relates to an apparatus and a method for allocating a guard band in a wireless communication system.

As used herein, terms referring to signals, terms referring to channels, terms referring to control information, terms referring to network entities, terms referring to components of an apparatus, and the like, are used for convenience of explanation. Therefore, the disclosure is not limited by the following terms, and other terms having equivalent technical meanings may be used.

Further, although the disclosure illustrates various embodiments using terms of some communication standards (e.g., 3rd Generation Partnership Project (3GPP)), these standards are provided merely for convenience of description. Various embodiments of the disclosure may be easily modified and applied to other communication systems.

FIG. 1 is a diagram illustrating a wireless communication system, according to an embodiment. FIG. 1 illustrates a base station 110, a first terminal 120, and a second terminal 130 as nodes using a wireless channel in wireless communication. Although FIG. 1 shows only one base station, another base station equivalent or similar to the base station 110 may also be included. Further, although FIG. 1 shows only two terminals, another terminal equivalent or similar to the first and second terminals 120 and 130 may also be included.

The base station 110 is a piece of network infrastructure that provides wireless access for the first and second terminals 120 and 130. The base station 110 has coverage defined as a certain geographic area based on the distance over which the base station 110 can transmit a signal. The base station 110 may be referred to as an access point (AP), an eNodeB (eNB), a 5th-generation (5G) node, a next-generation nodeB (gNB), a wireless point, a transmission/reception point (TRP), or another term with an equivalent technical meaning.

Each of the first terminal 120 and the second terminal 130 is a device used by a user and performs communication with the base station 110 through a wireless channel. In some cases, at least one of the first terminal 120 and the second terminal 130 may be operated without a user's involvement. That is, at least one of the first terminal 120 and the second terminal 130 may be a device performing machine-type communication (MTC), and may not be carried by a user. Each of the first terminal 120 and the second terminal 130 may be referred to as user equipment (UE), a mobile station, a subscriber station, a remote terminal, a wireless terminal, a user device, or another term with an equivalent technical meaning.

The base station 110, the first terminal 120, and the second terminal 130 may transmit and receive radio signals in a millimeter wave (mmWave) band (e.g., 28 GHz, 30 GHz, 38 GHz, and 60 GHz). In order to improve channel gain, the base station 110, the first terminal 120, and the second terminal 130 may perform beamforming. Beamforming may include transmission beamforming and reception beamforming. That is, the base station 110, the first terminal 120, and the second terminal 130 may assign directivity to a transmission signal or a reception signal. To this end, the base station 110 and the first and second terminals 120 and 130 may select serving beams 112, 113, 121, and 131 through a beam search procedure or a beam management procedure. After the serving beams 112, 113, 121, and 131 are selected, subsequent communication may be performed through resources that are in a quasi co-located (QCL) relationship with the resources used to transmit the serving beams 112, 113, 121, and 131.

When the large-scale characteristics of a channel carrying a symbol on a first antenna port can be inferred from a channel carrying a symbol on a second antenna port, the first antenna port and the second antenna port may be said to be in a QCL relationship. For example, the large-scale characteristics may include at least one of a delay spread, a Doppler spread, a Doppler shift, an average gain, an average delay, and a spatial receiver parameter.

Figure 2:
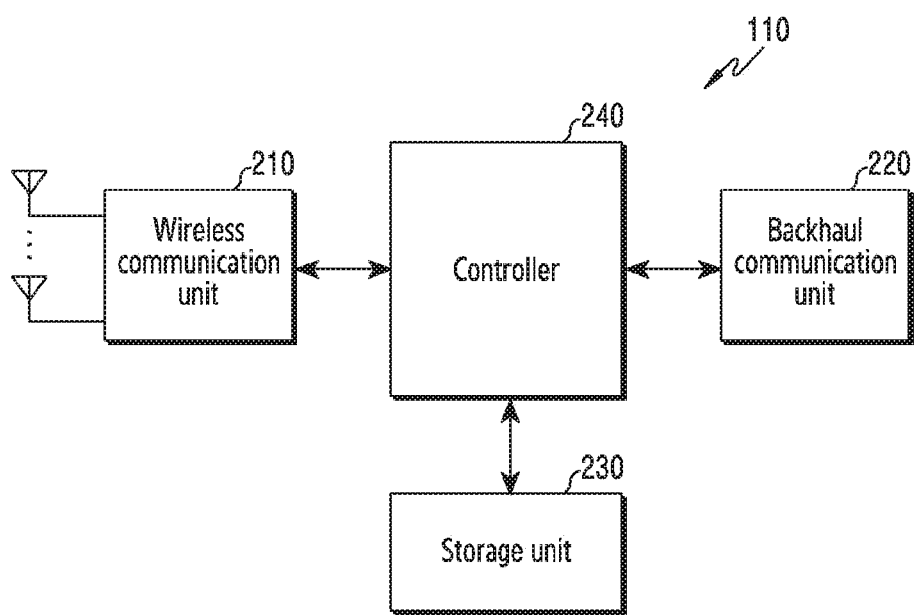
FIG. 2 is a diagram illustrating a configuration of a base station in a wireless communication system, according to an embodiment.

FIG. 2 is a diagram illustrating the configuration of a base station in a wireless communication system, according to an embodiment. The configuration illustrated in FIG. 2 may be construed as the configuration of the base station 110. The terms 'unit', '-or/er', and the like, as used herein, indicate a unit for processing at least one function or operation, which may be implemented by hardware, software, or a combination thereof.

Referring to FIG. 2, the base station 110 includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical layer specification of a system. For example, in data transmission, the wireless communication unit 210 encodes and modulates a transmitted bit stream to generate complex symbols.

Further, in data reception, the wireless communication unit 210 demodulates and decodes a baseband signal to reconstruct a received bit stream.

The wireless communication unit 210 upconverts a baseband signal into a radio-frequency (RF) band signal, and may transmit the RF band signal through an antenna. The wireless communication unit 210 downconverts an RF band signal, received through the antenna, into a baseband signal. To this end, the wireless communication unit 210 may include a transmission filter, a reception filter, an amplifier, a mixer, an oscillator, a digital-to-analog converter (DAC), an analog-to-digital converter (ADC), or the like. Further, the wireless communication unit 210 may include a plurality of transmission/reception paths. In addition, the wireless communication unit 210 may include at least one antenna array including a plurality of antenna elements.

From the aspect of hardware, the wireless communication unit 210 may include a digital unit and an analog unit, and the analog unit may include a plurality of sub-units according to operating power, operating frequency, or the like. The digital unit may be configured as at least one processor (e.g., a digital signal processor (DSP)).

As described above, the wireless communication unit 210 transmits and receives a signal. Accordingly, part or all of the wireless communication unit 210 may be referred to as a transmitter, a receiver, or a transceiver. Herein, transmission and reception performed through a wireless channel are construed as including processing performed as above by the wireless communication unit 210.

The backhaul communication unit 220 provides an interface for performing communication with other nodes in a network. That is, the backhaul communication unit 220 converts a bit stream, which is transmitted from the base station to another node, for example, another access node, another base station, a higher node, a core network, or the like, into a physical signal, and converts a physical signal, which is received from another node, into a bit stream.

The storage unit 230 stores data, such as a default program, an application, and configuration information, for the operation of the base station. The storage unit 230 may be configured as a volatile memory, a nonvolatile memory, or a combination of a volatile memory and a nonvolatile memory. The storage unit 230 provides the stored data in response to a request from the controller 240.

The controller 240 controls the overall operation of the base station. For example, the controller 240 transmits and receives a signal through the wireless communication unit 210 or the backhaul communication unit 220. Further, the controller 240 records and reads data in the storage unit 230. The controller 240 may perform functions of a protocol stack required by the communication standards. According to an embodiment, the protocol stack may be included in the wireless communication unit 210. To this end, the controller 240 may include at least one processor.

Figure 3:
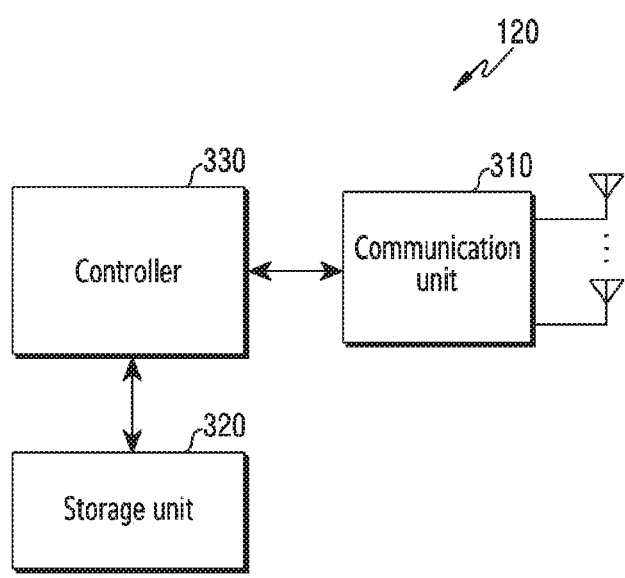
FIG. 3 is a diagram illustrating a configuration of a terminal in a wireless communication system, according to an embodiment.

FIG. 3 is a diagram illustrating the configuration of a terminal in a wireless communication system, according to an embodiment. The configuration illustrated in FIG. 3 may be construed as the configuration of the terminal 120. The terms 'unit', '-or/er', and the like, as used herein, indicate a unit for processing at least one function or operation, which may be implemented by hardware, software, or a combination thereof.

Referring to FIG. 3, the terminal 120 includes a communication unit 310, a storage unit 320, and a controller 330.

The communication unit 310 performs functions for transmitting or receiving a signal through a wireless channel. For example, the communication unit 310 performs a function of converting between a baseband signal and a bit stream according to the physical layer specification of a system. For example, in data transmission, the communication unit 310 encodes and modulates a transmitted bit stream to generate complex symbols. Further, in data reception, the communication unit 310 demodulates and decodes a baseband signal to reconstruct a received bit stream. The communication unit 310 upconverts a baseband signal into an RF band signal and may transmit the RF band signal through an antenna. The communication unit 310 downconverts an RF band signal, received through the antenna, into a baseband signal. For example, the communication unit 310 may include a transmission filter, a reception filter, an amplifier, a mixer, an oscillator, a DAC, an ADC, or the like.

The communication unit 310 may include a plurality of transmission/reception paths. In addition, the communication unit 310 may include at least one antenna array including a plurality of antenna elements. From the aspect of hardware, the communication unit 310 may include a digital circuit and an analog circuit (e.g., a radio frequency integrated circuit (RFIC)). The digital circuit and the analog circuit may be configured as a single package. Further, the communication unit 310 may include a plurality of RF chains. The communication unit 310 may perform beamforming.

As described above, the communication unit 310 transmits and receives a signal. Accordingly, part or the entirety of the communication unit 310 may be referred to as a transmitter, a receiver, or a transceiver. Herein, transmission and reception performed through a wireless channel are construed as including processing performed as above by the communication unit 310.

The storage unit 320 stores data, such as, for example, a default program, an application, and configuration information, for the operation of the terminal. The storage unit 320 may be configured as a volatile memory, a nonvolatile memory, or a combination of a volatile memory and a nonvolatile memory. The storage unit 320 provides the stored data in response to a request from the controller 330.

The controller 330 controls the overall operation of the terminal. For example, the controller 330 transmits and receives a signal through the communication unit 310. Further, the controller 330 records and reads data in the storage unit 320. The controller 330 may perform functions of a protocol stack required by the communication standards. To this end, the controller 330 may include at least one processor or microprocessor, or may be configured as a part of a processor. Part of the communication unit 310 and the controller 330 may be referred to as a communication processor (CP).

Figure 4:
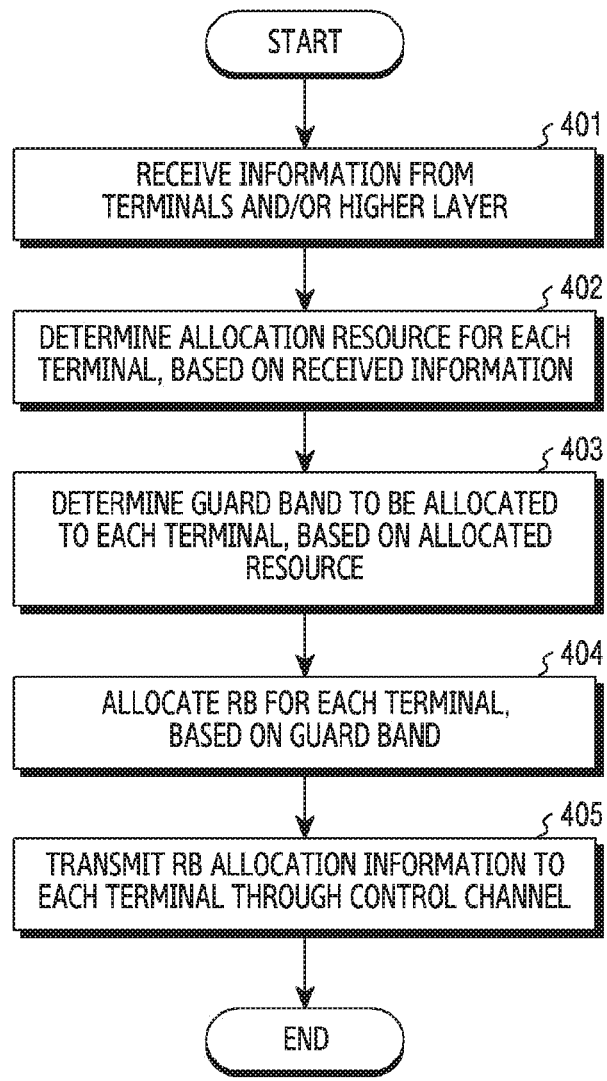
FIG. 4 is a flowchart illustrating a base station in a wireless communication system, according to an embodiment.

FIG. 4 is a flowchart of a base station in a wireless communication system, according to an embodiment of the disclosure. FIG. 4 illustrates an operating method of the base station 110.

Specifically, FIG. 4 shows a process in which, when the base station 110 configures different mixed numerologies for a plurality of terminals 120 and 130 connected to the base station 110, the base station 110 determines a guard band between sub-bands respectively allocated for the plurality of terminals 120 and 130 to have a minimum size.

Referring to FIG. 4, in operation 401, the base station receives information from terminals and/or a higher layer. In operation 401, the base station is connected to a plurality of terminals. The base station may receive information from each of the plurality of connected terminals. The information that the base station receives from each of the plurality of terminals may include at least one of a scheduling request (SR) for scheduling allocation, a status report for status information about the amount of UE transmission information (e.g., a buffer status report (BSR)), a power headroom report (PHR) for UE transmission power allocation, and a sounding reference signal (SRS) for channel estimation, such as path loss. The information that the base station receives from the higher layer may include at least one of a UE priority and buffer occupancy (BO) information for bandwidth allocation.

In operation 402, the base station determines an allocation resource for each of the plurality of terminals, based on the information received in operation 401. Specifically, the base station may allocate a sub-band or numerology for each terminal. Further, the base station may allocate a bandwidth for each terminal. In addition, the base station may configure transmission power for each terminal.

In operation 403, the base station determines a guard band to be allocated to each terminal, based on the allocated resource.

In one embodiment, the base station may determine a guard band having a minimum size to satisfy a target error vector magnitude (EVM) according to an EVM equation with transmission power ($\rho^{(0)}$, $\rho^{(1)}$) allocated per terminal, a bandwidth ($BW^{(0)}$, $BW^{(1)}$) allocated per terminal, and a current guard band size ($\Delta f_{a_{GB},b_{GB}}$) as parameters.

In another embodiment, the base station may determine a guard band having a minimum size to satisfy a target EVM according to an inter-numerology interference (INI) energy distribution with transmission power ($\rho^{(0)}$, $\rho^{(1)}$) allocated per terminal, a bandwidth ($BW^{(0)}$, $BW^{(1)}$) allocated per terminal, and a current guard band size ($\Delta f_{a_{GB},b_{GB}}$) as parameters.

In another embodiment, the base station may determine a guard band for each terminal using a combination of a predetermined weight, a tuning factor, and allocated resources.

In another embodiment, when a guard band for one terminal is already determined, the base station may determine a guard band for another terminal using a combination of a predetermined weight, a tuning factor, and allocated resources.

In another embodiment, the base station may determine a guard band using a combination of guard bands having the same size to satisfy a target EVM and allocated for two terminals, a predetermined weight, a tuning factor, and resources.

In another embodiment, the base station may determine a guard band for one terminal by inputting a target EVM into the inverse function of an EVM equation with a resource and a guard band as parameters, and may determine a guard band for another terminal using a combination of a predetermined weight, a tuning factor, and resources.

In operation 404, the base station allocates RBs for each terminal, based on the determined guard band. In one embodiment, the base station may allocate, to each terminal, RBs, other than RBs included in the guard band determined in operation 403, in a bandwidth allocated to each terminal.

In operation 405, the base station transmits RB allocation information to each terminal through a control channel. In one embodiment, the control channel may include at least one of a physical downlink control channel (PDCCH) and a control resource set (CORESET).

In order to achieve communication that satisfies requirements for a plurality of terminals using limited resources, appropriate resource allocation is required. To this end, a base station may receive, from each terminal, at least one of a scheduling request (SR), a status report for status information about the amount of UE transmission information (e.g., a BSR), a PHR for UE transmission power allocation, and an SRS for channel estimation, such as path loss. Further, the base station may receive at least one of a UE priority and BO information for bandwidth allocation from a higher layer. The base station determines a resource for each terminal, based on the information received from each terminal and/or the higher layer. The base station determines the resource for each terminal, based on transmission power information and bandwidth information.

According to an embodiment, the base station determines a guard band for each of the plurality of terminals allocated contiguous sub-bands in view of resources allocated to each of the plurality of terminals. The base station calculates the EVM of subcarriers in a bandwidth, based on a bandwidth and transmission power for each terminal, and determines an optimal guard band to satisfy a target EVM.

Figure 5:
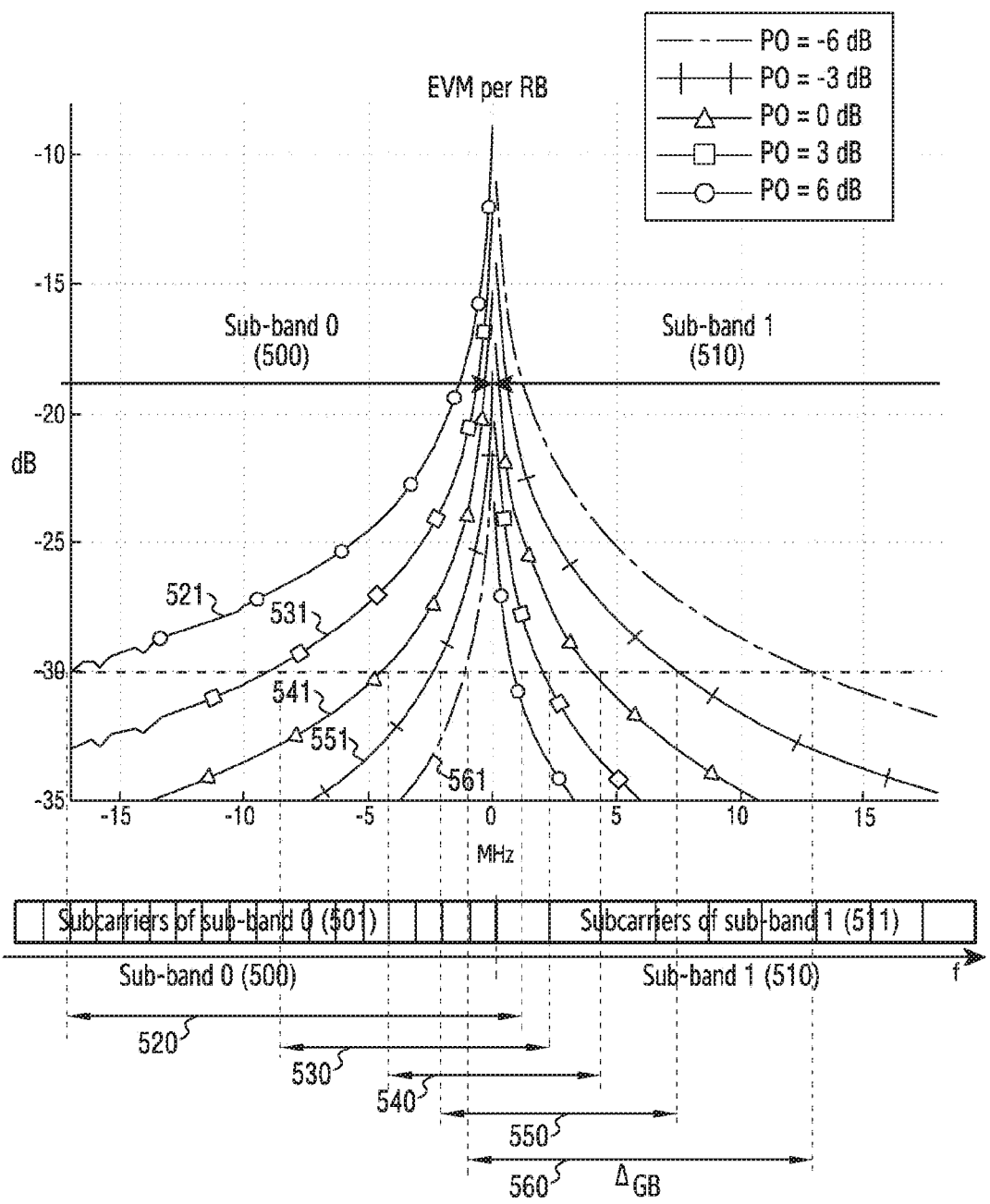
FIG. 5 is a diagram illustrating an error vector magnitude (EVM) distribution per RB according to a power offset (PO) in a wireless communication system, according to an embodiment.

FIG. 5 is a diagram illustrating an EVM distribution per RB according to a PO in a wireless communication system, according to an embodiment.

When a base station transmits different mixed numerologies for a plurality of terminals connected to the base station, a method is required for determining an optimal guard band in view of a difference in resources of the respective terminals. When an optimal guard band is not determined for the terminals of the mixed numerologies, a guard band unnecessarily occupying a resource may be allocated, and allocation of an inappropriate guard band may reduce transmission efficiency.

FIG. 5 shows an EVM distribution per RB of a sub-band according to a power offset. Referring to FIG. 5, when a guard band is allocated only to numerology on one high-power side or when a guard band is symmetrically allocated to both-side numerologies, transmission efficiency may be significantly reduced.

That is, in a case of power offset=6 dB (decibel), an optimal allocation method enables use of about 24.24% more frequencies based on a required EVM=−30 dB than an existing symmetric allocation method. A 66-MHz frequency may be used in the symmetric allocation method, while a 82-MHz frequency may be used according to the disclosed allocation.

FIG. 5 shows EVMs 521, 531, 541, 551, and 561 of subcarriers 501 and 511, when there is a power offset between the first terminal 120 using sub-band 0 500 and the second terminal 130 using sub-band 1 510, that is, a power difference between transmission power for the second terminal 130 and transmission power for the first terminal 120. When the power offset increases, the size of a guard band to be allocated to the first terminal 120 is increased and the size of a guard band to be allocated to the second terminal 130 is reduced in order to satisfy a target EVM (−30 dB). Regarding the position of a guard band, as the power offset increases, guard bands 520, 530, 540, 550, and 560 are gradually moved from the region of the sub-band 0 500 of the first terminal 120 to the region of the sub-band 1 510 of the second terminal 130.

Figure 6:
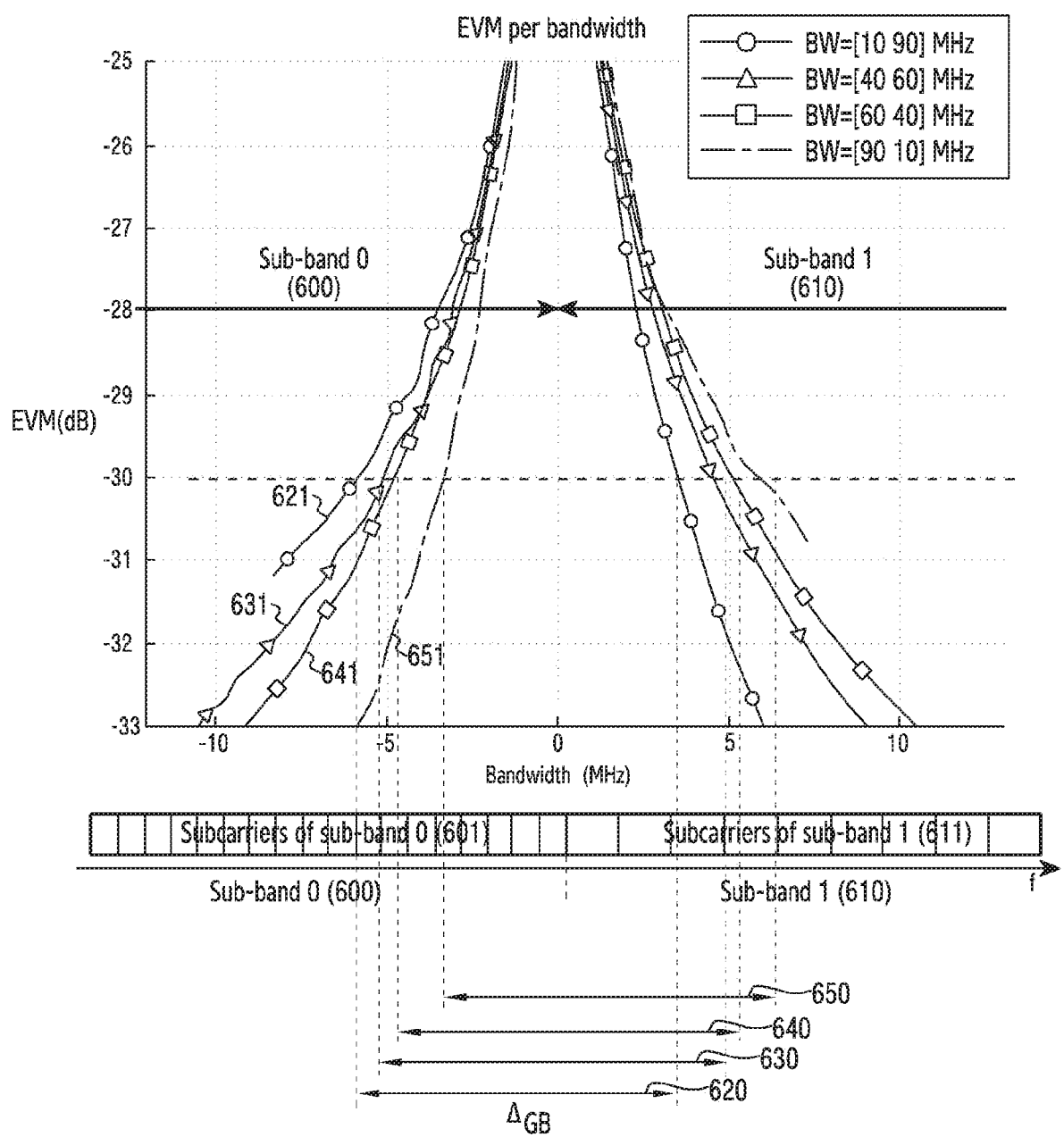
FIG. 6 is a diagram illustrating an error vector magnitude (EVM) distribution per RB according to a bandwidth in a wireless communication system, according to an embodiment.

FIG. 6 is a diagram illustrating an EVM distribution per RB according to a bandwidth in a wireless communication system, according to an embodiment.

FIG. 6 shows an EVM distribution in a sub-band according to a bandwidth allocated for each terminal. When a guard band is allocated only to numerology on one large-bandwidth side, or when a guard band is symmetrically allocated to both-side numerologies, transmission efficiency may be significantly reduced.

That is, when the allocated bandwidths are 90 MHz and 10 MHz, an optimal allocation method enables use of about 5.17% more frequencies based on a required EVM=−30 dB than an existing symmetric allocation method. That is, a 87-MHz frequency may be used in the symmetric allocation method, while a 91.5-MHz frequency may be used according to the disclosed allocation method.

FIG. 6 shows the EVMs 621, 631, 641, and 651 of subcarriers 601 and 611 according to a change in size of sub-band 0 600 of the first terminal 120 and sub-band 1 610 of the second terminal 130 in a 100-MHz channel bandwidth. As the ratio of sub-band 0 600 allocated to the first terminal 120 increases, or as the ratio of sub-band 1 610 allocated to the second terminal 130 decreases, the relative positions of guard bands 620, 630, 640, and 650 are moved in a direction toward sub-band 1 610 of the second terminal 130.

Referring to FIG. 5 and FIG. 6, an EVM varies depending on a combination of numerologies for terminals. Therefore, the size and position of a guard band according to a power offset and a bandwidth vary depending on a combination of numerologies for terminals.

According to an embodiment, when contiguous bandwidth parts, or sub-bands, for different numerologies are transmitted, an optimal guard band to satisfy a required receiver EVM may be allocated, thereby minimizing frequency occupancy by a guard band and maximizing resource efficiency.

Various embodiments provide a minimum guard band search method using an EVM when a numerology combination and an allocation resource are given. An EVM equation used in the disclosed method has power per terminal ($\rho^{(0)}$, $\rho^{(1)}$), an allocated bandwidth ($BW^{(0)}$, $BW^{(1)}$), and a current guard band size ($\Delta f_{a_{GB},b_{GB}}$) as parameters. When a target EVM for each terminal 120 and 130 is defined as $EVM_{Target}^{(0)}$, $EVM_{Target}^{(1)}$ and guard bands for sub-band 0 500 and 600 and sub-band 1 510 and 610 are respectively represented by $a_{GB}$ and $b_{GB}$, Equation (1), Equation (2), and Equation (3) may be applied.

$$\underset{\{a_{GB}, b_{GB}\}}{\arg\ \min} \Delta f_{a_{GB}, b_{GB}} \quad (1)$$

$$\text{s.t.}\ I_{EdgeRB}^{(0)}(\Delta f_{a_{GB}, b_{GB}}, \rho^{(0)}, \rho^{(1)}, BW^{(0)}, BW^{(1)}) \le EVM_{Target}^{(0)} \quad (2)$$

$$I_{EdgeRB}^{(1)}(\Delta f_{a_{GB}, b_{GB}}, \rho^{(0)}, \rho^{(1)}, BW^{(0)}, BW^{(1)}) \le EVM_{Target}^{(1)} \quad (3)$$

Here, $I_{EdgeRB}^{(i)}(\Delta f_{a_{GB}, b_{GB}}, \rho^{(0)}, \rho^{(1)}, BW^{(0)}, BW^{(1)})$ denotes interference of sub-band j in an edge 1 RB of sub-band i.

Various embodiments provide a minimum guard band search algorithm for determining an optimal guard band. According to the disclosed algorithm, guard bands are detected such that an EVM satisfies a target EVM by individually including subcarriers of a sub-band for each terminal in a guard band from a subcarrier contiguous to another sub-band, among which the smallest guard band is applied. An example of a code for the disclosed algorithm is illustrated below in Table 1.

TABLE 1

1: A, B are the set of candidate subcarrier for guard band of sub-band0 and sub-band1
2: initialize a=A, b=B
3: for $a_{GB}$=0 do A TABLE 1-continued 4:   for $b_{GB}$=1 do B
5:     calculate $I_{EdgeRB}^{(0)}(\Delta f_{a_{GB}, b_{GB}}, \rho^{(0)}, \rho^{(1)}, BW^{(0)}, BW^{(1)})$,
    $I_{EdgeRB}^{(1)}(\Delta f_{a_{GB}, b_{GB}}, \rho^{(0)}, \rho^{(1)}, BW^{(0)}, BW^{(1)})$
6:     if $I_{EdgeRB}^{(0)}(\Delta f_{a_{GB}, b_{GB}}, \rho^{(0)}, \rho^{(1)}, BW^{(0)}, BW^{(1)}) \le EVM_{Target}^{(0)}$,
    $I_{EdgeRB}^{(1)}(\Delta f_{a_{GB}, b_{GB}}, \rho^{(0)}, \rho^{(1)}, BW^{(0)}, BW^{(1)}) \le EVM_{Target}^{(1)}$
7:     valid = 1
8:     go to 10
9:   end for
10:   if valid = 1 and $|a_{GB} - b_{GB}| < |a - b|$
11:     a = $a_{GB}$, b = $b_{GB}$
12: end for
13: return a, b FIG. 7 is a diagram illustrating a process of a minimum guard band search algorithm in a wireless communication system, according to an embodiment.

Figure 7:
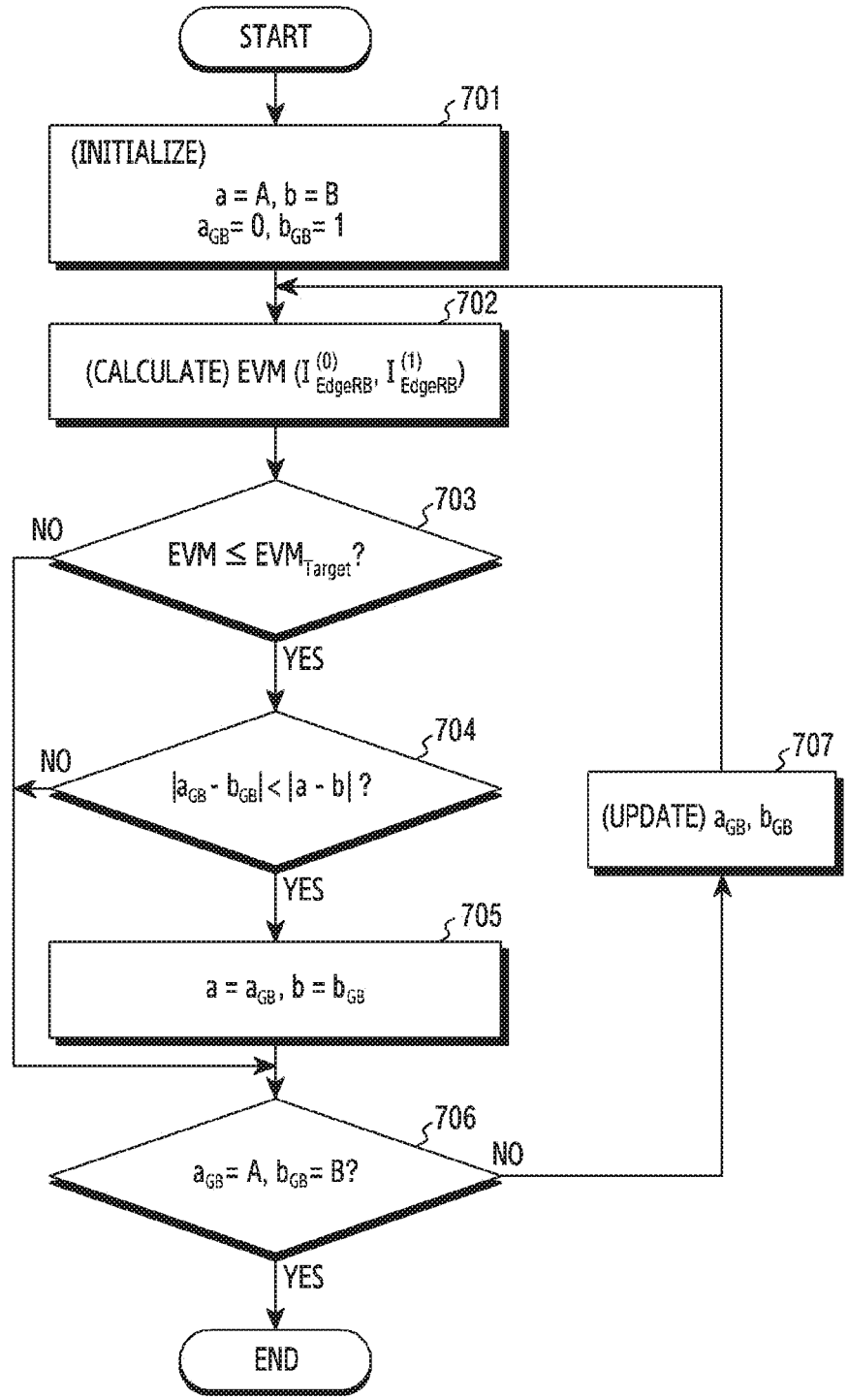
FIG. 7 is a diagram illustrating a process of a minimum guard band search algorithm in a wireless communication system, according to an embodiment.

Specifically, FIG. 7 illustrates a flowchart of a minimum guard band search algorithm illustrated in Table 1.

In operation 701, a base station configures a resource difference between sub-bands using different numerologies in initialization. Sub-band 0 500 and 600 and sub-band 1 510 and 610 are represented by $a_{GB}$ and $b_{GB}$, respectively.

In operation 702, the base station calculates an EVM according to allocation of a guard band in a sub-band. According to an embodiment, the base station may use a look-up table (LUT) compiled from previous EVM calculation results. An EVM equation has a power per terminal ($\rho^{(0)}$, $\rho^{(1)}$), an allocated bandwidth ($BW^{(0)}$, $BW^{(1)}$), and a current guard band size ($\Delta f_{a_{GB}, b_{GB}}$) as parameters.

In operation 703, the base station determines whether an EVM in a guard band configuration satisfies a target EVM requirement. A target EVM for each terminal 120 and 130 is represented by $EVM_{Target}^{(0)}$, $EVM_{Target}^{(1)}$. If not, the methodology proceeds to operation 706.

In operation 704, the base station determines whether a guard band satisfying the target EVM requirement is a minimum guard band. If not, the methodology proceeds to operation 706.

In operation 705 and operation 706, the base station determines whether the minimum guard band is updated.

When the base station determines that the minimum guard band is to be updated, in operation 707, the base station updates the determined minimum guard band, and the methodology returns to operation 702. If the minimum guard band is not to be updated, the methodology ends.

Various embodiments provide a method for determining a minimum guard band that satisfies a target EVM using statistic characteristics of INI when a numerology combination and an allocation resource are given. The energy of INI has a chi-square distribution, and the distribution has transmission power ($\rho^{(0)}$, $\rho^{(1)}$) for each terminal, an allocated bandwidth ($BW^{(0)}$, $BW^{(1)}$), and a current guard band size ($\Delta f_{a_{GB}, b_{GB}}$) as parameters. Various embodiments provide a method for obtaining a minimum guard band such that the probability that the energy of INI is smaller than a target EVM is 1, in which Equation (4), Equation (5), and Equation (6) may be applied.

$$\underset{\{a_{GB}, b_{GB}\}}{\arg\ \min} \Delta f_{a_{GB}, b_{GB}} \quad (4)$$

$$\text{s.t.}\ Pr\big(Z^{(0)}(\Delta f_{a_{GB}, b_{GB}}, \rho^{(0)}, \rho^{(1)}, BW^{(0)}, BW^{(1)}) \le EVM_{Target}^{(0)}\big) = 1 \quad (5)$$

$$Pr\big(Z^{(1)}(\Delta f_{a_{GB}, b_{GB}}, \rho^{(0)}, \rho^{(1)}, BW^{(0)}, BW^{(1)}) \le EVM_{Target}^{(1)}\big) = 1 \quad (6)$$

Various embodiments provide a statistics-based minimum guard band search algorithm for determining an optimal guard band. According to the disclosed algorithm, guard bands are detected such that the probability that the energy of INI is smaller than a target EVM is 1 by individually including subcarriers of a sub-band for each terminal in a guard band from a subcarrier contiguous to another sub-band, among which the smallest guard band is applied. An example of a code for the disclosed algorithm is illustrated below in Table 2.

TABLE 2

1: A, B are the set of candidate subcarrier for guard band of sub-band0 and sub-
    band1
2: initialize a=A, b=B
3: for $a_{GB}$ = 0 do A
4:     for $b_{GB}$ = 1 do B
5:         calculate $Pr(Z^{(0)} (\Delta f_{a_{GB},b_{GB}}, \rho^{(0)}, \rho^{(1)}, BW^{(0)}, BW^{(1)}) \leq EVM_{Target}^{(0)})$
           $Pr(Z^{(1)} (\Delta f_{a_{GB},b_{GB}}, \rho^{(0)}, \rho^{(1)}, BW^{(0)}, BW^{(1)}) \leq EVM_{Target}^{(1)})$
6:         if $Pr(Z^{(0)} (\Delta f_{a_{GB},b_{GB}}, \rho^{(0)}, \rho^{(1)}, BW^{(0)}, BW^{(1)}) \leq EVM_{Target}^{(0)}) = 1$,
           $Pr(Z^{(1)} (\Delta f_{a_{GB},b_{GB}}, \rho^{(0)}, \rho^{(1)}, BW^{(0)}, BW^{(1)}) \leq EVM_{Target}^{(1)}) = 1$
7:             valid = 1
8:             go to 10
9:         end for
10:        if valid = 1 and $|a_{GB} - b_{GB}| < |a - b|$
11:            a = a = $a_{GB}$, b = $b_{GB}$
12: end for
13: return a, b FIG. 8 is a diagram illustrating a process of a statistics-based minimum guard band search algorithm in a wireless communication system, according to an embodiment.

Figure 8:
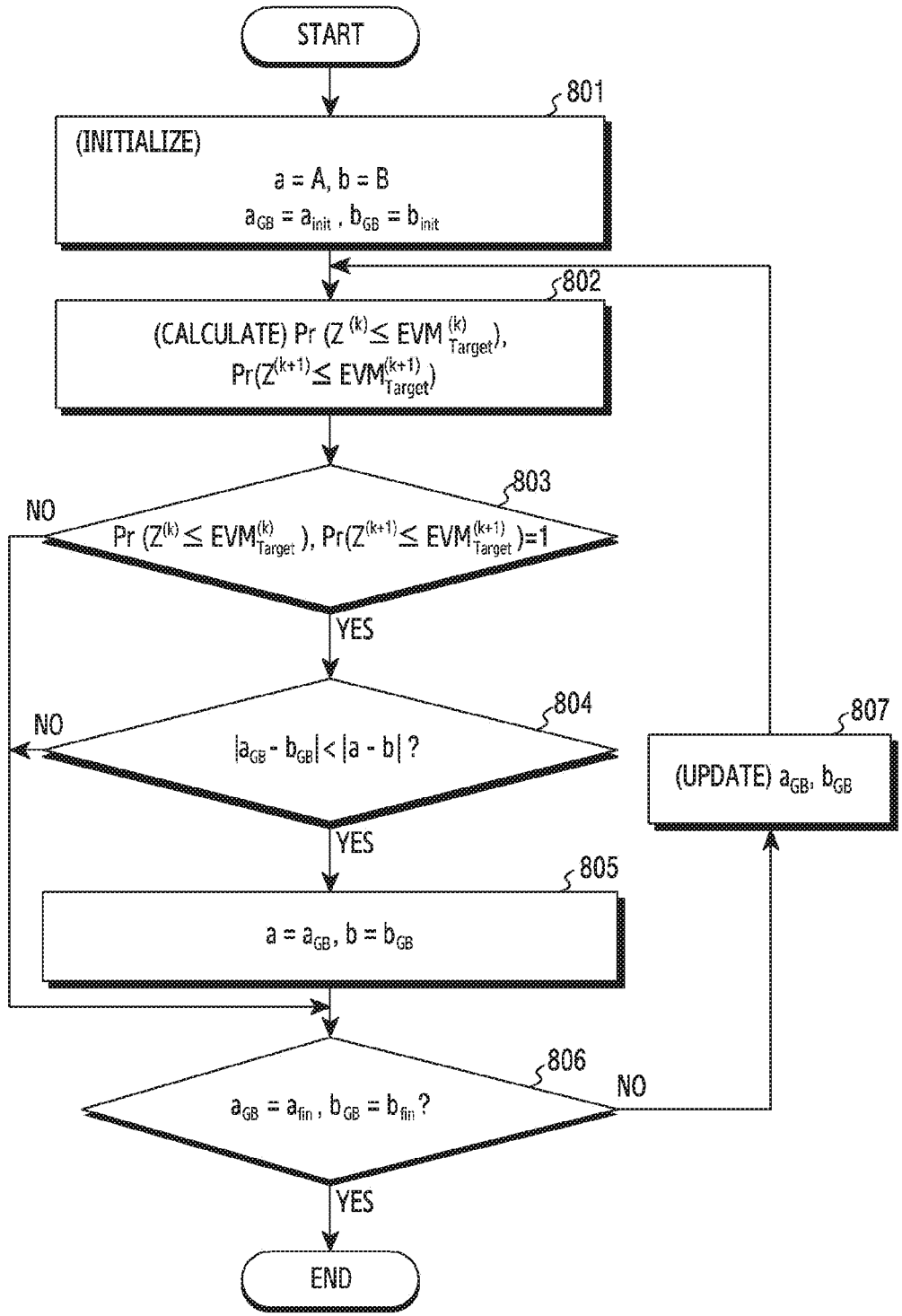
FIG. 8 is a diagram illustrating a process of a statistics-based minimum guard band search algorithm in a wireless communication system, according to an embodiment.

Specifically, FIG. 8 illustrates a flowchart of a statistics-based minimum guard band search algorithm illustrated in Table 2.

In operation 801, a base station configures a resource difference between sub-bands using different numerologies in initialization. Sub-band 0 500 and 600 and sub-band 1 510 and 610 are represented by $a_{GB}$ and $b_{GB}$, respectively.

In operation 802, the base station calculates the probability that the energy of INI is smaller than a target EVM according to allocation of a guard band in a sub-band. The energy of INI has a chi-square distribution, and the distribution has transmission power ($\rho^{(0)}, \rho^{(1)}$) for each terminal, an allocated bandwidth ($BW^{(0)}, BW^{(1)}$), and a current guard band size ($\Delta f_{a_{GB},b_{GB}}$) as parameters.

In operation 803, the base station determines whether an EVM in a guard band configuration satisfies a target EVM requirement. A target EVM for each terminal 120 and 130 is represented by $EVM_{Target}^{(0)}, EVM_{Target}^{(1)}$. The base station determines whether the probability that the energy of INI is smaller than the target EVM is 1. When the EVM does not satisfy a target EVM requirement, the methodology proceeds to operation 806.

In operation 804, the base station determines whether a guard band satisfying the target EVM requirement is a minimum guard band. When the guard band is not the minimum guard band, the methodology proceeds to operation 806.

In operation 805 and operation 806, the base station determines whether the minimum guard band is updated.

When the minimum guard band is to be updated, in operation 807, the base station updates the determined minimum guard band, and the methodology returns to operation 802. When the minimum guard band is not to be updated, the methodology ends.

Figure 9:
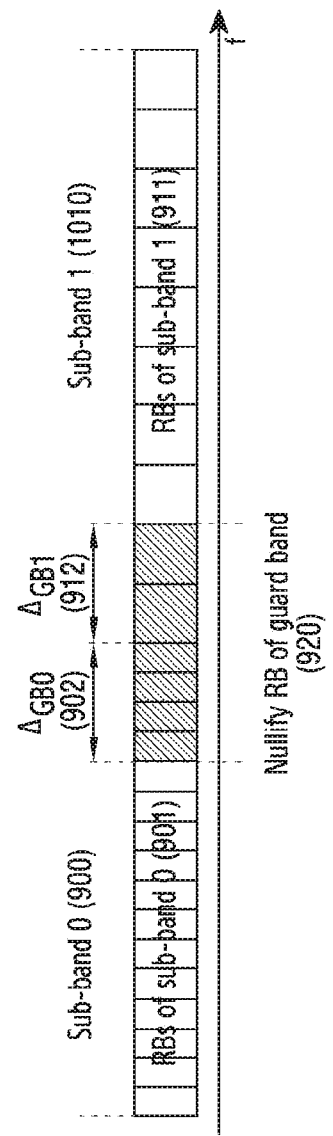
FIG. 9 is a diagram illustrating an example of frequency distribution of a sub-band in a wireless communication system, according to an embodiment.

FIG. 9 is a diagram illustrating an example of frequency distribution of a sub-band in a wireless communication system, according to an embodiment.

Specifically, FIG. 9 illustrates an example of guard band allocation in view of a power offset and a bandwidth.

FIG. 9 illustrates a guard band GB0 902 allocated for sub-band 0 900 of the first terminal 120, and a guard band GB1 912 allocated for sub-band 1 910 of the second terminal 130.

When the numerology of the sub-band for each terminal is represented by $\mu_0, \mu_1$, the frequency distribution of the sub-band may be as shown in FIG. 9.

Referring to FIG. 9, a base station determines RBs 901 and 911 to be allocated to each terminal, based on a guard band determined according to various embodiments in view of a resource for each terminal.

Specifically, the base station determines the RBs 901 and 911 in the sub-bands 900 and 910 for the respective terminals by excluding, that is, nullifying 920, RBs of the guard bands 902 and 912 for the respective terminals from a bandwidth allocated for each terminal.

After determining the RBs 901 and 911, the base station transmits information about the allocated RBs to each terminal through a control channel, such as a PDCCH or CORESET.

When R is a set of resources, a guard band for each sub-band may be represented by Equation (7) below.

$$\Delta_{GB_k} = \sum_{r \in R} w_{r,k} \cdot \Delta_{ref,r} + c_k \qquad (7)$$

Here, $c_k$ is a tuning factor of sub-band k, $w_{r,k}$ is a weight varying depending on an allocation level of sub-band k, and $\Delta_{ref,r}$ is a reference guard band value varying depending on the type of a resource.

Figure 10:
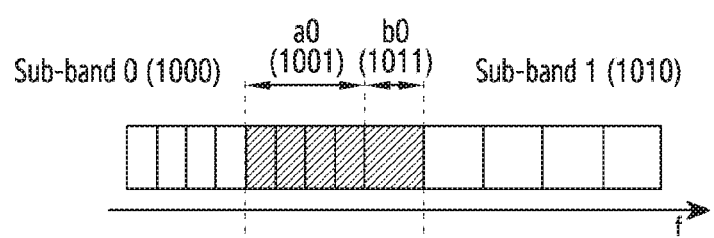
FIG. 10 is a diagram illustrating an example of guard band allocation for each sub-band according to a power offset in a wireless communication system, according to an embodiment.

FIG. 10 is a diagram illustrating an example of guard band allocation for each sub-band according to a power offset in a wireless communication system, according to an embodiment.

FIG. 10 illustrates a guard band a0 1001 allocated for sub-band 0 1000 of the first terminal 120, and a guard band b0 1011 allocated for sub-band 1 1010 of the second terminal 130.

A reference guard band may be configured in units of subcarriers or RBs, or may be configured in units of hertz (Hz). For example, considering R={power offset ($\Delta P$)} as a resource set and assuming $\Delta P > P_0 > 0$, different guard bands may be allocated according to Equation (7) such that $\Delta_{GB0} = a0$ and $\Delta_{GB1} = b0$ (a0>b0), as shown in FIG. 10.

Figure 11:
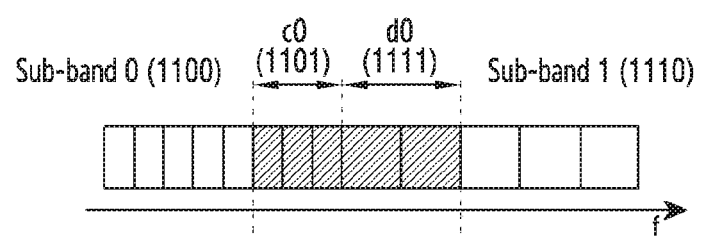
FIG. 11 is a diagram illustrating an example of guard band allocation for each sub-band according to an allocated bandwidth in a wireless communication system, according to an embodiment.

FIG. 11 is a diagram illustrating an example of guard band allocation for each sub-band according to an allocated bandwidth in a wireless communication system, according to an embodiment.

FIG. 11 illustrates a guard band c0 1101 allocated for sub-band 0 1100 of the first terminal 120, and a guard band c0 1111 allocated for sub-band 1 1110 of the second terminal 130.

Considering R={allocated bandwidth} as a resource set and assuming BW0=A and BW1=B, guard bands may be allocated according to Equation (7) such that $\Delta_{GB0} = c0$ and $\Delta_{GB1} = d0$, as shown in FIG. 11.

Figure 12:
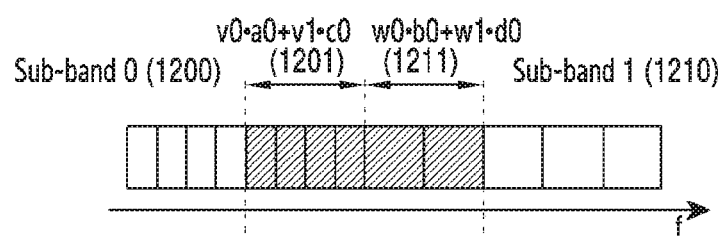
FIG. 12 is a diagram illustrating an example of guard band allocation for each sub-band according to a power offset and an allocated bandwidth in a wireless communication system, according to an embodiment.

FIG. 12 is a diagram illustrating an example of guard band allocation for each sub-band according to a power offset and an allocated bandwidth in a wireless communication system, according to an embodiment.

FIG. 12 illustrates a guard band GB0 1201 allocated for sub-band 0 1200 of the first terminal 120, and a guard band GB1 1211 allocated for sub-band 1 1210 of the second terminal 130.

Considering both a power offset between the terminals and an allocated bandwidth, when R={power offset, allocated BW}, $\Delta P > P_0 > 0$, BW0=A, and BW1=B), guard bands allocated for the respective sub-bands may be represented according to Equation (7) as $\Delta_{GB0} = v0 \cdot a0 + v1 \cdot c0$ and $\Delta_{GB1} = w0 \cdot b0 + w1 \cdot d0$, as shown in FIG. 12

The values of a weight, a reference guard band, and various factors used in various embodiments may be stored in advance in a look-up table (LUT) in a memory and used by a base station.

According to an embodiment, the guard band $\Delta_{GB1}$ allocated for sub-band 1 1210 of the second terminal 130 may be derived as a value relative to the guard band $\Delta_{GB0}$ allocated for sub-band 0 1200 of the first terminal 120, an example of which is as follows. When determining guard bands for a data block and a synchronization signal (SS) block (SSB), a guard band for the SSB is fixed. When the fixed guard band is defined as $\Delta_{GB0}$, R={power offset ($\Delta P$)} is considered as a resource set, and $\Delta P > P_0 > 0$ is assumed, a different guard band may be obtained through an equation for the fixed guard band, such as Equation (8).

$$\Delta_{GB_{k+1}} = \Delta_{GB_k} + \sum_{r \in R} w_{r,k+1} \cdot \Delta_{ref,k+1} + c_{k+1} \quad (8)$$

Here, the values of a weight, a reference guard band, and various factors may be stored in advance in the LUT in the memory and used by the base station.

According to an embodiment, the base station may derive a relative guard band, based on a guard band in a method of allocating guard bands ($\Delta_{GB,Symmetric}/2$) having the same size to two sub-bands, as shown in Equation (9).

$$\Delta_{GB_{k+1}} = \frac{\Delta_{GB,symmetric}}{2} + \sum_{r \in R} w_{r,k+1} \Delta_{ref,k+1} + c_{k+1} \quad (9)$$

Here, the values of a weight, a reference guard band, and various factors may be stored in advance in the LUT in the memory and used by the base station.

According to an embodiment, the base station may obtain a guard band for one sub-band by inputting a target EVM into the inverse function of an EVM equation for a resource and a guard band and may derive a relative guard band, based on the guard band, as shown in Equation (10).

$$\Delta_{GB_{k+1}} = f^{-1}(EVM_{Target}) + \sum_{r \in R} w_{r,k+1} \cdot \Delta_{ref,r} + c_{k+1} \quad (10)$$

Here, the values of a weight, a reference guard band, and various factors may be stored in advance in the LUT in the memory and used by the base station. Further, the result of the inverse function for the target EVM may also be stored in the LUT and used.

Figure 13:
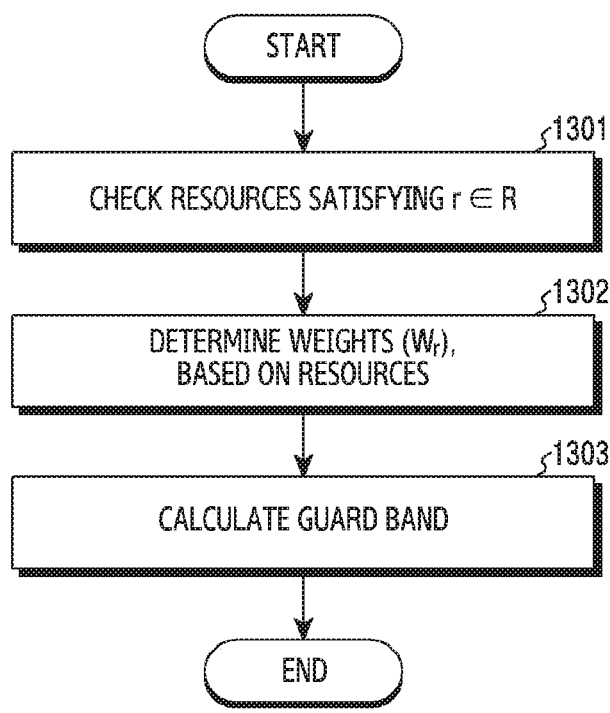
FIG. 13 is a diagram illustrating an example of a process of using the values of a weight, a reference guard band, and a tuning factor in a wireless communication system, according to an embodiment.

FIG. 13 is a flowchart illustrating an example of a process of using the values of a weight, a reference guard band, and a tuning factor in a wireless communication system, according to an embodiment.

In operation 1301, a base station checks resources r belonging to a resource set R.

In operation 1302, the base station determines weights Wr, based on the checked resources r.

In operation 1303, the base station calculates a guard band using the values of the determined weights, a reference guard band, and a tuning factor.

Figure 14:
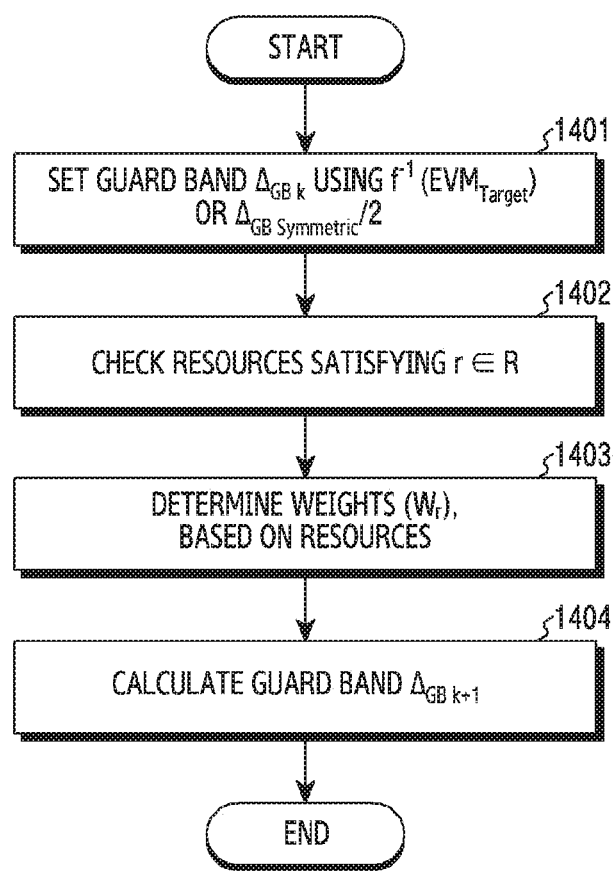
FIG. 14 is a diagram illustrating an example of a process of using the values of a weight, a reference guard band, and a tuning factor in a wireless communication system, according to an embodiment.

FIG. 14 is a diagram illustrating an example of a process of using the values of a weight, a reference guard band, and a tuning factor in a wireless communication system, according to an embodiment.

In operation 1401, a base station configures a guard band $\Delta_{GB_k}$ for one sub-band by inputting a target EVM into the inverse function of an EVM equation for a resource and a guard band or derives a relative guard band $\Delta_{GB_k}$, based on a guard band in a method of allocating guard bands ($\Delta_{GB,Symmetric}/2$) having the same size to two sub-bands.

In operation 1402, the base station checks resources r belonging to a resource set R.

In operation 1403, the base station determines weights Wr, based on the checked resources r.

In operation 1404, the base station calculates a guard band $\Delta_{GB_{k+1}}$ using the values of the determined weights, a reference guard band, and a tuning factor.

Various embodiments provide a method for allocating a guard band according to a resource difference between numerologies in transmission of mixed numerologies of 5th-generation new radio (5G NR).

According to various embodiments, a guard band may be allocated according to a resource difference, thereby reducing unnecessary guard band allocation, and a decrease in guard band allocation may increase spectrum efficiency. In addition, according to various embodiments, a guard band may be adaptively allocated in LTE-NR dynamic spectrum sharing, thereby maximizing LTE and NR throughputs.

According to various embodiments, mixed-numerology guard bands may be minimized in scenarios of transmitting multiple bandwidth parts, such as NR mixed numerologies, for example, enhanced mobile broadband (eMBB), ultra-reliable low-latency communication (URLLC), and massive machine-type communication (mMTC), thereby maximizing throughput (TP).

Furthermore, according to various embodiments, an adaptive guard band of LTE/NR dynamic spectrum sharing may be minimized.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory (RAM) and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

What is claimed is:

1. An operating method of a base station in a wireless communication system, the method comprising:
   receiving first information from a plurality of user equipments (UEs);
   receiving, from a higher layer, second information comprising information on UE priorities;
   determining a respective allocation resource for each of the plurality of UEs, based on the first information and the second information;
   determining a respective guard band to be allocated for each of the plurality of UEs, based on the respective allocation resource, wherein a guard band for one UE among the plurality of UEs is determined by inputting a predetermined target error vector magnitude (EVM) into an inverse function of a predetermined EVM equation with the respective allocation resource and the respective guard band as parameters and a guard band for a different UE among the plurality of UEs is determined based on a predetermined weight, a tuning factor, and another respective allocation resource;
   determining respective resource blocks (RBs) for each of the plurality of UEs, based on the respective guard band; and
   transmitting information about the determined respective RBs to respective UEs of the plurality of UEs.

2. The method of claim 1, wherein the first information received from the plurality of UEs comprises at least one of a scheduling request (SR), a buffer status report (BSR), a power headroom report (PHR), and a sounding reference signal (SRS).

3. The method of claim 1, wherein the second information received from the higher layer further comprises information on buffer occupancy (BO).

4. The method of claim 1, wherein the respective allocation resource comprises at least one of a sub-band, a numerology, a bandwidth, and a transmission power for a respective UE of the plurality of UEs.

5. The method of claim 1, wherein the respective guard band is determined based on a predetermined weight, a tuning factor, and the respective allocation resource.

6. The method of claim 1, wherein the respective guard band is determined based on a transmission power allocated to a respective UE of the plurality of UEs, a bandwidth allocated to the respective UE of the plurality of UEs, and a current guard band size.

7. The method of claim 1, wherein the respective guard band is a guard band with a minimum size satisfying the predetermined target EVM requirement.

8. The method of claim 1, wherein the respective guard band is determined using an inter-numerology interference (INI) energy distribution.

9. The method of claim 1, wherein the respective RBs comprise RBs other than RBs belonging to the respective guard band in a bandwidth allocated for a respective UE of the plurality of UEs.

10. A base station in a wireless communication system, the base station comprising:
    a transceiver; and
    at least one processor configured to be functionally connected to the transceiver,
    wherein the at least one processor is configured to:
      receive first information from a plurality of user equipments (UEs);
      receive, from a higher layer, second information comprising information on UE priorities;
      determine a respective allocation resource for each of the plurality of UEs, based on the first information and the second information;
      determine a respective guard band to be allocated for each of the plurality of UEs, based on the respective allocation resource, wherein a guard band for one UE among the plurality of UEs is determined by inputting a predetermined target error vector magnitude (EVM) into an inverse function of a predetermined EVM equation with the respective allocation resource and the respective guard band as parameters and a guard band for a different UE among the plurality of UEs is determined based on a predetermined weight, a tuning factor, and another respective allocation resource;
      determine respective resource blocks (RBs) for each of the plurality of UEs, based on the respective guard band; and
      transmit information about the determined respective RBs to respective UEs of the plurality of UEs.

11. The base station of claim 10, wherein the first information received from the plurality of UEs comprises at least one of a scheduling request (SR), a buffer status report (BSR), a power headroom report (PHR), and a sounding reference signal (SRS).

12. The base station of claim 10, wherein the second information received from the higher layer further comprises information on buffer occupancy (BO).

13. The base station of claim 10, wherein the respective allocation resource comprises at least one of a sub-band, a numerology, a bandwidth, and a transmission power for a respective UE of the plurality of UEs.

14. The base station of claim 10, wherein the respective guard band is determined based on a predetermined weight, a tuning factor, and the respective allocation resource.

15. The base station of claim 10, wherein the respective guard band is determined based on transmission power allocated to a respective UE of the plurality of UEs, a bandwidth allocated to the respective UE of the plurality of UEs, and a current guard band size.

16. The base station of claim 10, wherein the respective guard band is a guard band with a minimum size satisfying the predetermined target EVM requirement.

17. The base station of claim 10, wherein the respective guard band is determined using an inter-numerology interference (INI) energy distribution.

18. The base station of claim 10, wherein the respective RBs comprise RBs other than RBs belonging to the respective guard band in a bandwidth allocated for a respective UE of the plurality of UEs.

* * * * *